US008175071B2

(12) United States Patent
Nam et al.

(10) Patent No.: US 8,175,071 B2
(45) Date of Patent: May 8, 2012

(54) INTERCELL INTERFERENCE MITIGATION APPARATUS AND METHOD

(75) Inventors: Junyoung Nam, Daejeon (KR); Seong Rag Kim, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 378 days.

(21) Appl. No.: 12/479,036

(22) Filed: Jun. 5, 2009

(65) Prior Publication Data

US 2009/0232247 A1 Sep. 17, 2009

Related U.S. Application Data

(63) Continuation of application No. PCT/KR2007/006153, filed on Nov. 30, 2007.

(30) Foreign Application Priority Data

Dec. 5, 2006 (KR) .................. 10-2006-0122112
Apr. 12, 2007 (KR) .................. 10-2007-0035859

(51) Int. Cl.
H04B 7/208 (2006.01)
(52) U.S. Cl. ........ 370/344; 455/501; 455/63.1; 455/296
(58) Field of Classification Search .......................... None
See application file for complete search history.

(56) References Cited

U.S. PATENT DOCUMENTS 7,474,640 B2 * 1/2009 Doron et al. .................. 370/328
7,697,906 B2 * 4/2010 Himayat et al. ........... 455/127.1
7,813,453 B2 * 10/2010 Khandekar et al. ........... 375/340

2003/0103584 A1 6/2003 Bjerke et al.
2004/0062302 A1 * 4/2004 Fujii et al. ..................... 375/232
2004/0181744 A1 9/2004 Sindhushayana
2004/0242179 A1 * 12/2004 Onggosanusi et al. ....... 455/296
2005/0232195 A1 10/2005 Jones (Continued)

FOREIGN PATENT DOCUMENTS

JP 2005-236364 9/2005

(Continued)

OTHER PUBLICATIONS

Kafle, Padam L. et al., "Iterative Semi-Blind Multiuser Detection for Coded MC-CDMA Uplink System," *IEEE Transactions on Communications*, vol. 51 (7):1034-1039 (2003).

(Continued)

*Primary Examiner* — Min Jung
(74) *Attorney, Agent, or Firm* — Nelson Mullins Riley & Scarborough LLP; EuiHoon Lee, Esq.

(57) ABSTRACT

There is provided an intercell interference mitigation apparatus for use in a terminal having a single reception antenna in a multi-cell downlink of an OFDMA system. The apparatus includes one or more parallel interference cancellers for canceling intercell interference by respreading soft decision values of cells other than a self cell; one or more LLR creation blocks for creating channel LLRs required for the soft decision for each of subcarriers, and producing channel soft outputs; one or more soft deciders for performing a soft decision of a self user symbol of the self cell in which interferences from other users are mitigated, and producing the soft decision values; and one or more channel estimation blocks for performing iterative channel estimation by respreading symbols of the soft decision values produced from the soft deciders.

8 Claims, 4 Drawing Sheets

U.S. PATENT DOCUMENTS

| | | |
|---|---|---|
| 2006/0172716 A1 | 8/2006 | Yoshii et al. |
| 2006/0198292 A1 | 9/2006 | Yoshii et al. |
| 2007/0093261 A1* | 4/2007 | Hou et al. .................... 455/506 |
| 2007/0149242 A1* | 6/2007 | Kim et al. .................... 455/525 |

FOREIGN PATENT DOCUMENTS

| | | |
|---|---|---|
| KR | 1020050060631 | 6/2005 |
| KR | 1020050102332 | 10/2005 |
| KR | 1020060079662 | 7/2006 |

OTHER PUBLICATIONS

Kuhn, Christian et al., "Single Antenna Interference Cancellation Using a List-Sequential (LISS) Algorithmm," *IEEE Global Telecommunications Conference*, vol. 3:1604-1608 (2005).

Ranta, Pekka A. et al., "Co-channel Interference Cancelling Receiver for TDMA Mobile Systems," *IEEE International Conference on Communications*, vol. 1:17-21 (1995).

Korean Notice of Allowance for Application No. 10-2007-0035859, dated Nov. 28, 2009.

Korean Office Action for Application No. 10-2007-0035859, dated May 29, 2009.

\* cited by examiner

US 8,175,071 B2

INTERCELL INTERFERENCE MITIGATION APPARATUS AND METHOD

RELATED APPLICATIONS

This application is a Continuation Application of PCT International Application No. PCT/KR2007/006153 filed on Nov. 30, 2007, which designates the United States and claims priority to, and the benefit of, Korean Patent Applications No. 10-2006-0122112, filed on Dec. 5, 2006 and No. 10-2007-0035859, filed on Apr. 12, 2007. The contents of the aforementioned applications are hereby incorporated by reference.

FIELD OF THE INVENTION

The present invention relates to an apparatus and a method for mitigating intercell interference in a mobile terminal having a single reception antenna in a multi-cell downlink of an Orthogonal Frequency Division Multiple Access (OFDMA) system.

BACKGROUND OF THE INVENTION

Terminals with multiple reception antennas can relatively easily mitigate intercell interference using time/space diversity in a downlink of an OFDMA system. However, in a terminal with a single reception antenna, intercell interference cancellation is a difficult task. The intercell interference greatly deteriorates mobility and stability of a mobile communication system in a cell boundary area.

Early technologies for intercell interference cancellation, which employ a single reception antenna in a downlink, were associated with Time Division Multiple Access (TDMA). According to TDMA, intracell interference can be avoided, but intercell interference exists in a cell boundary area to greatly deteriorate the system performance.

As a method for mitigating such intercell interference, a Maximum Likelihood Sequence Detection (MLSD) technique has been used to process, by joint detection, signals of several cells in a cell boundary area. However, since this technique uses a Viterbi algorithm for joint detection, it has a disadvantage in that the complexity increases exponentially with respect to the number of total users of all cells.

As a solution to such a computational complexity problem, an iterative reception technique based on the turbo principle has been proposed.

Further, another iterative reception technique based on Minimum Mean Squared Error (MMSE) MultiUser Detection (MUD) has been proposed for canceling intercell interference in a multicarrier Code Division Multiple Access (CDMA) system based on OFDMA technology. However, this technology also suffers from the problem of complexity in that an inverse of a matrix whose dimension is equal to the number (e.g., 1024) of multicarriers or arbitrary spreading elements should be calculated for every symbol.

SUMMARY OF THE INVENTION

It is, therefore, an object of the present invention is to mitigate intercell interference in a terminal having a single reception antenna in a multi-cell downlink by applying an iterative reception technique using channel coding.

In accordance with one aspect of the present invention, there is provided an intercell interference mitigation apparatus for use in a terminal having a single reception antenna in a multi-cell downlink of an OFDMA system, the apparatus comprising one or more parallel interference cancellers for canceling intercell interference by respreading soft decision values of cells other than a self cell; one or more LLR creation blocks for creating channel LLRs required for the soft decision for each of subcarriers, and producing channel soft outputs; one or more soft deciders for performing a soft decision of a self user symbol of the self cell in which interferences from other users are mitigated, and producing the soft decision values; and one or more channel estimation blocks for performing iterative channel estimation by respreading symbols of the soft decision values produced from the soft deciders.

In accordance with another aspect of the present invention, there is provided an intercell interference mitigation method for use in a terminal having a single reception antenna in a multi-cell downlink of an OFDMA system, the method comprising canceling intercell interference by respreading soft decision values of cells other than a self cell; creating channel LLRs required for the soft decision for each of subcarriers to produce channel soft outputs; performing a soft decision of a self user symbol of the self cell, in which interferences from other users are mitigated, to produce the soft decision values; and performing iterative channel estimation by respreading symbols of the soft decision values produced in said performing the soft decision.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

In an OFDMA system, subcarriers undergo an environment same as a Time Division Multiple Access (TDMA) environment in a flat fading channel. Since multipath diversity is not available in this case, it is very difficult to cancel intercell interference using a single reception antenna. In order to provide a solution to this problem, the present invention proposes an iterative reception technique using channel coding. In accordance with the present invention, a reliability of Log-Likelihood Ratio (LLR) and a reception performance can be greatly enhanced by a channel coding gain obtained through the iterative reception technique using channel coding.

In accordance with the present invention, intercell interference is efficiently canceled in a downlink of an OFDMA system by employing an iterative reception technique. A soft decision is used for the iterative reception technique of the present invention, and a soft decision value obtained through channel decoding is used under intercell cooperation in which user's channel code information is shared among all cells.

In a conventional linear multiuser detection technique, the system efficiency and the reception performance is deteriorated, and the complexity of receiver is increased. In accordance with the present invention, since the iterative reception technique is performed through channel coding, the redundancy is considerably lower than a spreading gain of a joint channel estimation multiuser detection technique. Further, in accordance with the present invention, the calculation amount for the detection can be made small while guaranteeing a high reception performance.

In the following, an OFDMA system model will be described to help to understand the present invention.

A transmit signal b of a $q^{th}$ cell of an OFDMA system that has L-number of subcarriers and a multi-cell environment of Q-number of cells is expressed as in Eq. (1):

$$b=[b_0, b_1, \ldots, b_{L-1}]^T \qquad \text{Eq. (1)}$$

The transmit signal is modulated, goes through a flat fading channel to reach a receiver, in which a cyclic prefix is removed and the resultant signal is Fourier transformed. Thus obtained signal is a reception signal r in a frequency domain, expressed as in Eq. (2):

$$r=Hb+n \qquad \text{Eq. (2)}$$

Herein, $H=\text{Diag}(H_0, H_1, \ldots, H_{L-1})$ is a diagonal matrix constituted by channel frequency responses, and n is a white Gaussian noise.

Meanwhile, a reception signal in an $l^{th}$ subcarrier of the OFDMA system under a multi-cell environment having Q number of cells is expressed by Eq. (3):

$$r_l = \sum_{q=1}^{Q} H_{q,l} b_{q,l} + n_l \qquad \text{Eq. (3)}$$

Hereinafter, embodiments of the present invention will be described in detail with reference to the accompanying drawings. In the following description, well-known functions or constructions will not be described in detail since they may obscure the invention.

Figure 1:
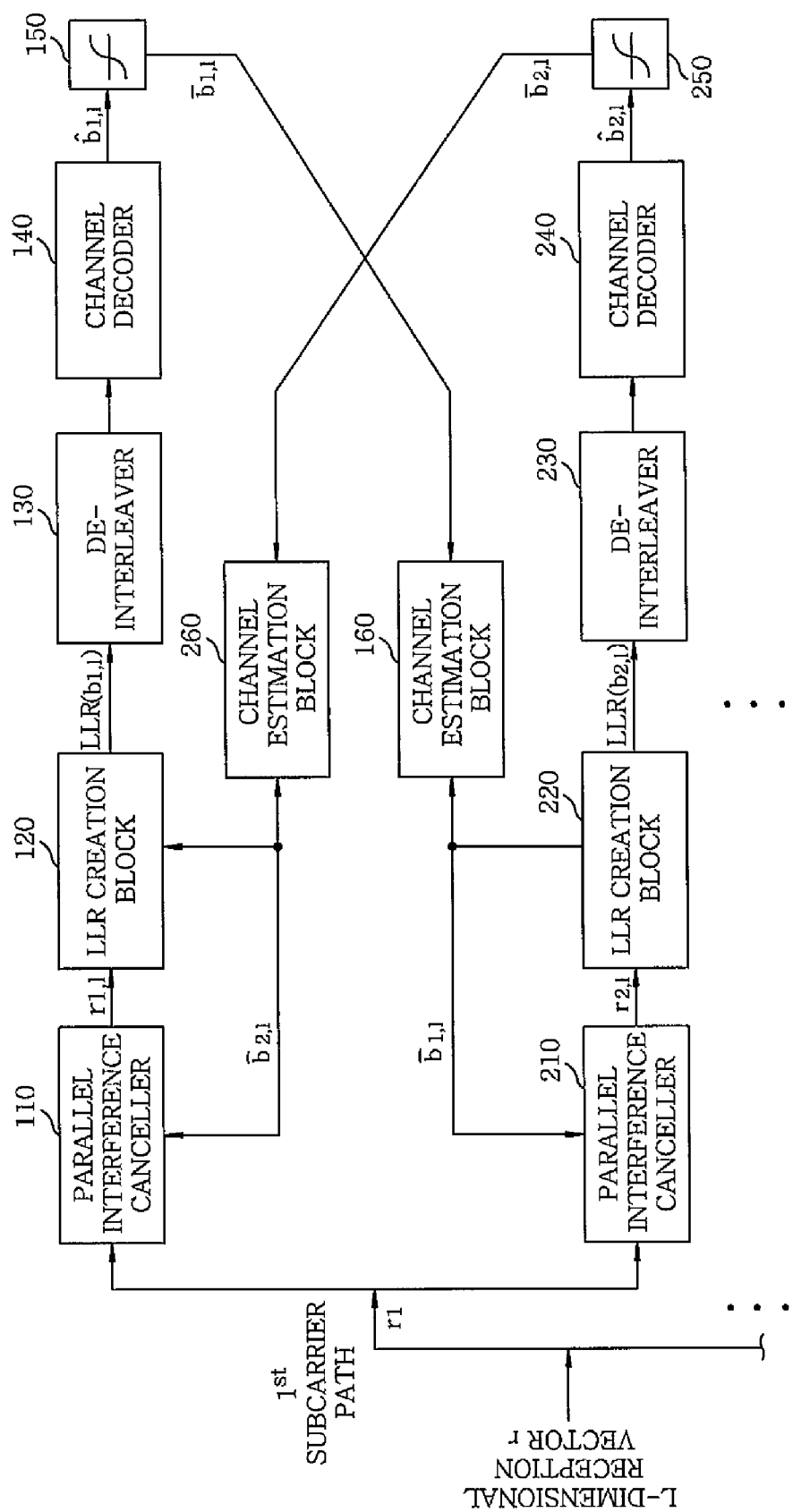
FIGS. 1 and 2 are block diagrams illustrating an intercell interference mitigation apparatus in accordance with an embodiment of the present invention.
Figure 2:
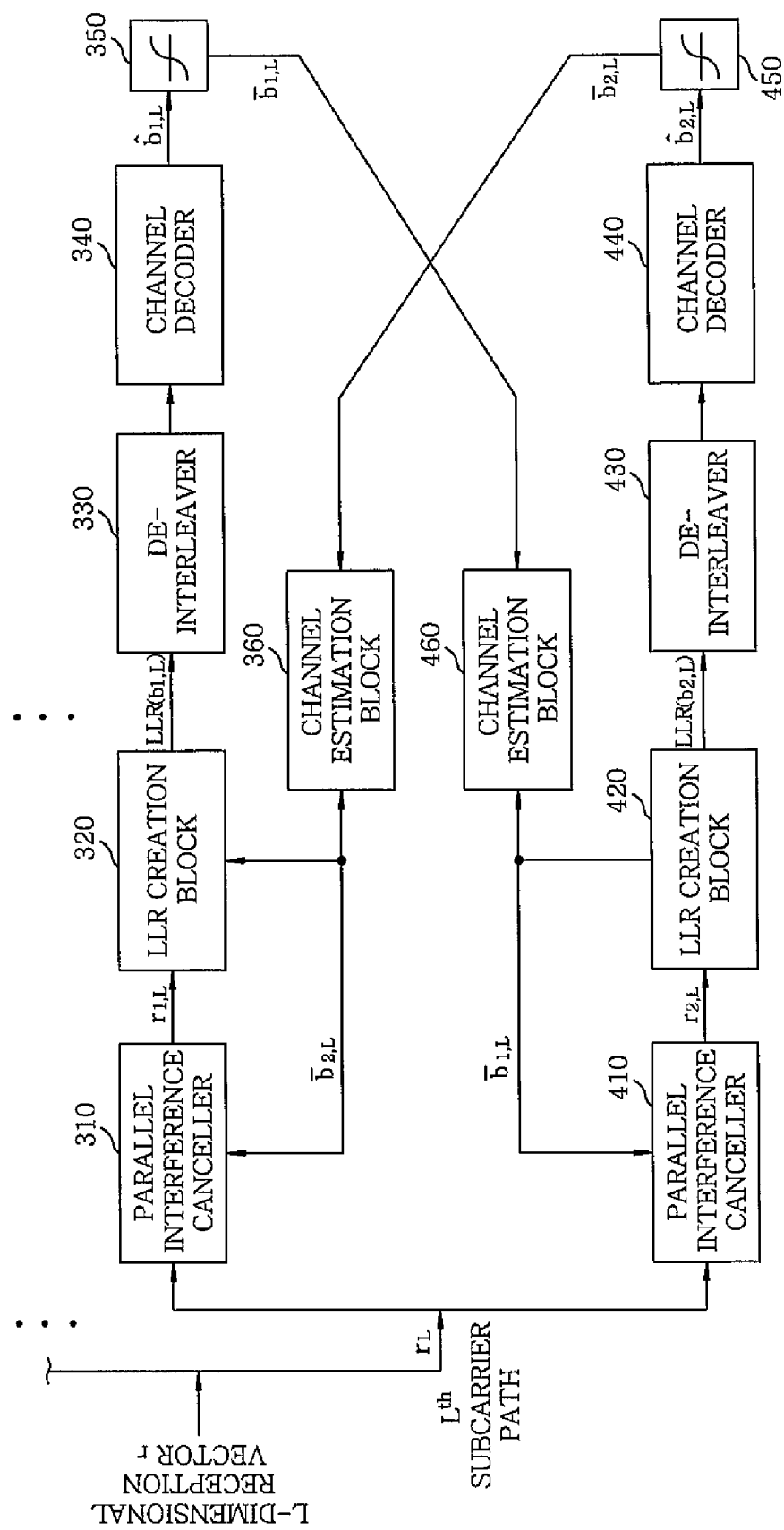

FIGS. 1 and 2 are block diagrams illustrating a receiving device for canceling intercell interference in a downlink in an OFDMA system in accordance with an embodiment of the present invention. The following description will focus on the iterative reception technique in accordance with the present invention. Descriptions of well-known basic devices (for example, a discrete Fourier transformation device for transforming a reception signal of a time domain into that of a frequency domain, and a device for removing a cyclic prefix of a frequency-domain transformed signal) will be omitted for simplicity.

Although a pilot symbol shown in FIGS. 1 and 2 follows a general rule without any additional limitation, parallel interference cancellation and channel equalization will be first described under the assumption of the perfect channel estimation. A method of channel estimation will be described in the end of the detailed description of the present invention. Further, superscripts of all equations described below denote a sequence of iterative reception. However, marking of the sequence has been omitted in the block diagrams of FIGS. 1 and 2 for simplicity.

As shown therein, the intercell interference mitigation apparatus in accordance with the present invention includes parallel interference cancellers 110, 210, 310, and 410 for canceling intercell interference by respreading soft decision values of cells other than a self-cell; LLR creation blocks 120, 220, 320, and 420 for creating channel LLRs per each subcarrier required for the soft decision; de-interleavers 130, 230, 330, and 430 for canceling channel concentration errors of channel soft outputs produced from the LLR creation blocks 120, 220, 320, and 420; channel decoders 140, 240, 340, and 440 for decoding outputs from the de-interleavers 130, 230, 330, and 430 by channel decoding to thereby provide the decoded soft outputs; soft deciders 150, 250, 350, and 450 for performing soft decision on a self-user symbol of a self-cell in which interferences from other users is mitigated; and channel estimation blocks 160, 260, 360, and 460 for performing iterative channel estimation using respread symbols of soft decision values produced from the soft deciders 150, 250, 350, and 450.

Hereinafter, principles of the intercell interference mitigation in accordance with the present invention will be described in detail.

A reception signal of an $l^{th}$ subcarrier under an OFDMA environment having Q-number of cells is expressed by Eq. (3) as described above.

If a signal of a first cell is to be detected in a discrete phase modulation scheme in which Q=2, a parallel-interference cancelled signal $r_{1,l}^i$ of an $i^{th}$ sequence of an $l^{th}$ subcarrier of a first cell whose interference cancellation is based on a soft decision of a second cell is expressed as in Eq. (4):

$$r_{1,l}^i = r_l - H_{2,l}\bar{b}_{2,l}^i \qquad \text{Eq. (4)}$$
$$= H_{1,l}b_{1,l} + H_{2,l}\tilde{b}_{2,l}^i + n_l$$

Herein, $\bar{b}_{2,l}^i = E[b_{2,l}]$ is a soft decision by channel decoding, and $\tilde{b}_{2,l}^i = b_{2,l} - \bar{b}_{2,l}^i$ is a residual interference remaining after the interference cancellation is completed.

An LLR of a transmit signal x for a matching filter output y in a linear Gaussian or fading channel is expressed as in Eq. (5):

$$LLR(y \mid x) = \log\frac{P(y \mid x = +1)}{P(y \mid x = -1)} \qquad \text{Eq. (5)}$$
$$= \log\frac{\exp\left(-\frac{E_s}{N_0}(y-a)^2\right)}{\exp\left(-\frac{E_s}{N_0}(y+a)^2\right)}$$
$$= \frac{4a \cdot E_s}{N_0} \cdot y$$

Herein, a is equal to 1 in case of Gaussian channel, and is equivalent to a fading amplitude in case of fading channel. Since an output of a Maximum A Posteriori (MAP) channel decoder is based on channel coding, a more reliable LLR can be acquired therefrom.

Assuming in Eq. (4) that $H_{2,l}\tilde{b}_{2,l}^i + n_l$ is a Gaussian random variable, an LLR of $b_{1,l}$ is expressed as in Eq. (6):

$$LLR(r_{1,l}, \mid b_{1,l}) = \log\frac{f(r_{1,l} \mid b_{1,l} = +1)}{f(r_{1,l} \mid b_{1,l} = -1)} \qquad \text{Eq. (6)}$$
$$= \frac{4}{|H_{2,l}|^2 \sigma_{k,l}^{i2} + N_0} \mathcal{R}(H_{1,l}^* r_{1,l})$$

Herein, $$Q_{2,l}^{i2} = E\left[|\tilde{b}_{2,l}^i|^2\right]$$

is a variance of the residual interference remaining after the interference cancellation is completed. Eq. (6) is a general LLR calculation formula for a matching filter output in a fading channel. From observation of the LLR, it can be appreciated that a single tap equalizer is included in a typical OFDMA receiver.

In Eq. (6), the variance $\sigma_{k,l}^{i^2}$ of the residual interference can be approximated as $\sigma_{k,l}^{i^2} = 1 - \overline{b}_{k,l}^{i^2}$ on the following assumptions. First, let us define a correlation $S_{k,l}$ between an actual symbol and an estimated symbol as in Eq. (7):

$$S_{k,l} = E[b_{k,l} \overline{b}_{k,l}^i] \qquad \text{Eq. (7)}$$

Next, let us assume that a soft decision symbol is modeled as in Eq. (8):

$$\overline{b}_{k,l}^{i^2} = s_{k,l} b_{k,l} + \Psi_{k,l} \qquad \text{Eq. (8)}$$

Here, if it is assumed that there exists no correlation between $b_{k,l}$ and $\Psi_{k,l}$, it is followed that $E[\Psi_{k,l}^2] = 2s_{k,l}(1 - s_{k,l})$. Thus, the approximate value can be finally obtained as in Eq. (9):

$$\sigma_{k,l}^{i^2} = 1 - \overline{b}_{k,l}^{i^2} \qquad \text{Eq. (9)}$$

After interferences from cells other than the first cell in the $i^{th}$ sequence have been canceled, a Signal-To-Noise Ratio (SINR) can be calculated as in Eq. (10):

$$SINR = \frac{2|H_{1,l}|^2}{\sum_{q=2}^{Q} |H_{q,l}|^2 \sigma_{q,l}^{i^2} + N_0} \qquad \text{Eq. (10)}$$

Here, it can be expected that, as intercell interference is canceled more successfully, the above SINR becomes closer to a SINR for a single user.

If there is intercell cooperation in which user channel code information is shared among all cells, the reliability of LLR can be greatly enhanced through MAP decoding. A typical algorithm for calculating a soft output of the MAP decoding is a BCJR algorithm. Such a MAP decoding algorithm performs an efficient calculation by greatly reducing an amount of calculation of soft output as described below. An LLR of a transmit signal x for a matching filter output y in a linear Gaussian or fading channel is expressed as in Eq. (11):

$$LLR(x \mid y) = \log \frac{P(x = +1 \mid y)}{P(x = -1 \mid y)} \qquad \text{Eq. (11)}$$

By using the Bayesian rule, Eq. (11) can be expressed as in Eq. (12):

$$LLR(x \mid y) = \log \frac{P(y \mid x = +1) P(x = +1)}{P(y \mid x = -1) P(x = -1)} \qquad \text{Eq. (12)}$$

$$= \log \frac{\exp\left(-\frac{E_s}{N_0}(y - a)^2\right)}{\exp\left(-\frac{E_s}{N_0}(y + a)^2\right)} + \log \frac{P(x = +1)}{P(x = -1)}$$

$$= \frac{4a \cdot E_s}{N_0} \cdot y + LLR(x)$$

Herein, a is equal to 1 in case of Gaussian channel, and is equivalent to a fading amplitude in case of fading channel. A second term of Eq. (12) corresponds to the LLR of Eq. (6).

Since an output of a Maximum A Posteriori (MAP) channel decoder is based on channel coding, a more reliable LLR can be acquired therefrom.

A channel estimation method using a pilot symbol can be divided into a time-domain insertion type and a frequency-domain insertion type. Among these, the following description of the present invention will focus on a time-domain pilot symbol method. In an OFDMA system including a downlink OFDM, if channel estimation is not accurate, a receiver that considers intercell interference may be worse in performance than a conventional receiver that does not consider intercell interference. In this regard, a method for improving channel estimation by a pilot symbol through an Expectation Maximization (EM) algorithm will be described below.

Figure 3:
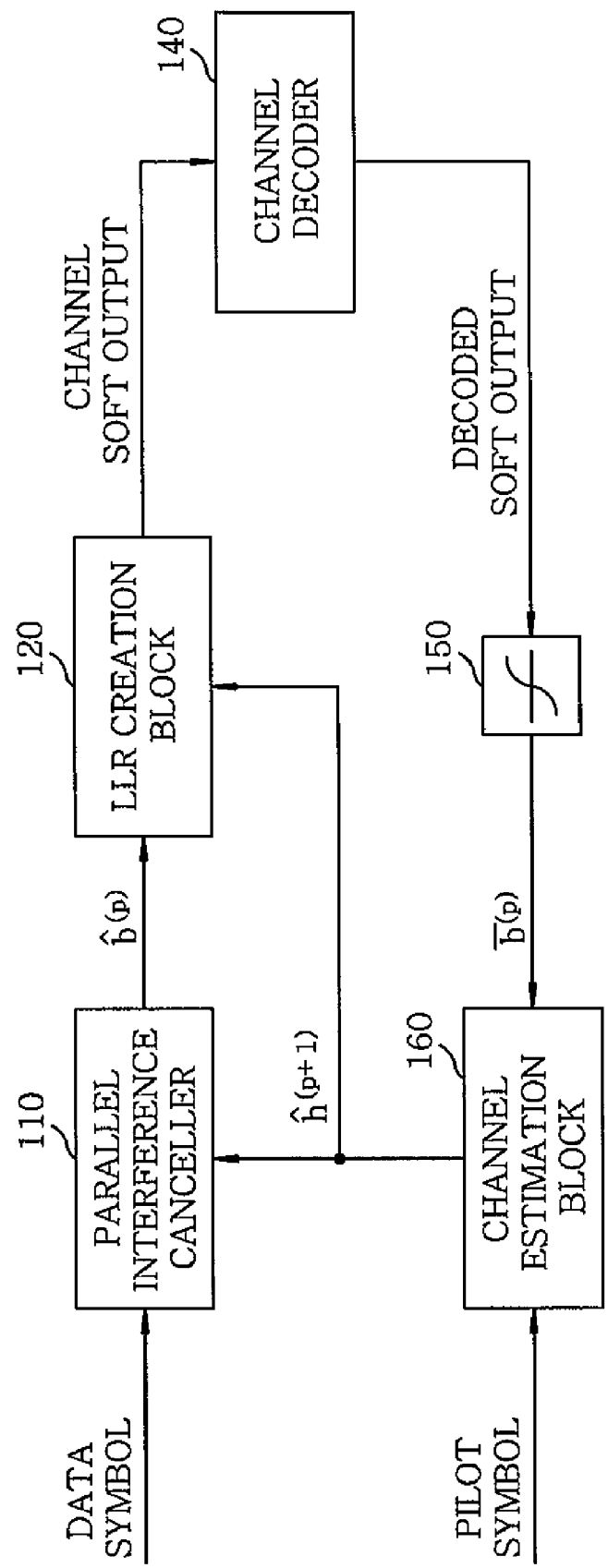
FIG. 3 is a signal flow diagram illustrating a channel decoding and soft decision procedure in the intercell interference mitigation apparatus shown in FIGS. 1 and 2.
Figure 4:
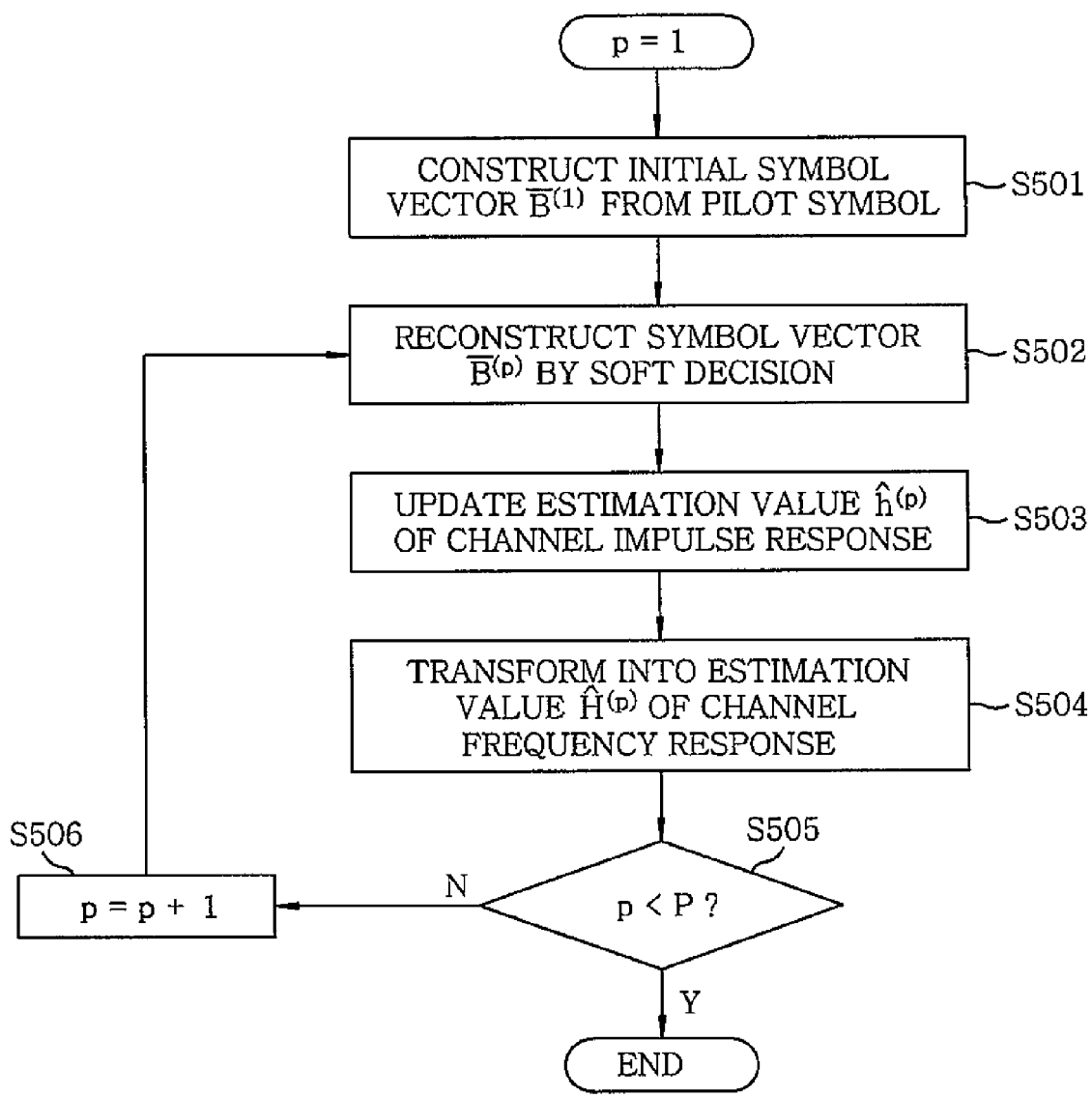
FIG. 4 is a flowchart illustrating an iterative channel estimation procedure in the intercell interference mitigation apparatus shown in FIGS. 1 and 2.

FIG. 3 illustrates an example of a channel decoding and soft decision procedure based on the EM algorithm in case of the intercell cooperation that user channel code information is shared among all cells; and FIG. 4 illustrates an example of iterative channel estimation procedure based on the EM algorithm. Here, if it were not for the intercell cooperation, the channel decoder 140 of FIG. 3 would be omitted. Further, in the following, only channel estimation of the self cell will be considered.

The following result can also be applied to cells other than the self cell. Therefore, instead of a channel frequency response matrix $H = \text{Diag}(H_0, H_1, \ldots, H_{L-1})$, a vector $\tilde{H} = [H_0, H_1, \ldots, H_{L-1}]^T$ will be used by removing a subscript "q" that denotes the sequence of cell. Also, if we let a channel impulse response be an N-dimensional vector $h = [h_0, h_1, \ldots h_{N-1}]^T$, a relationship of $\tilde{H} = F_{ch} h$ is established. Here, an L×N matrix $F_{ch}$ is a discrete Fourier Transformation matrix for obtaining a channel frequency response function, and is expressed as in Eq. (13):

$$[F_{ch}]_{l,p} = e^{-j2\pi l p / L} \qquad \text{Eq. (13)}$$

A maximum likelihood channel estimation using a reception signal r of the OFDMA system given as Eq. 2 is expressed as in Eq. (14):

$$\hat{h}_{ml} = \arg\max_h f(r \mid h) \qquad \text{Eq. (14)}$$

In Eq. (14), f(r|h) is a likelihood function of r for a channel impulse response h. A non-linearity of the likelihood function makes it very difficult to obtain a maximum likelihood estimation value. Therefore, the maximum likelihood estimation value can be more easily obtained by applying the EM algorithm as follows.

The reception signal r of Eq. 2 is expressed as in Eq. (15):

$$r = B\tilde{H} + n = BF_{ch} h + n \qquad \text{Eq. (15)}$$

Herein, $B = \text{Diag}(b_0, b_1, \ldots, b_{L-1})$, and a vector form of the diagonal matrix B is $b = [b_0, b_1, \ldots, b_{L-1}]^T$. To apply the EM algorithm, let us assume that the given reception signal r is an actually observed imperfect data X, and a symbol b to be detected is an unobserved data Y. Then, {r,s} can be assumed to be a perfect data Z, and the EM algorithm can be constructed as follows.

For channel estimation using the EM algorithm, an initial value $\overline{B}^{(1)}$ of $\overline{B}^{(p)}$ is constructed (step S501 shown in FIG. 4) as an initial value vector in which a pilot symbol is inserted in a position of a pilot subcarrier and the remaining positions of subcarriers are all filled with zero. In other words, the $\overline{B}^{(1)}$, which is an initial symbol vector, is constructed by using the pilot symbol.

However, the initial value vector has a great influence on the performance of the EM algorithm. Therefore, a more dense pilot symbol is required for obtaining a better channel estimation value. Thus, in order to realize an efficient channel estimation technique, a pilot symbol deployment and the system efficiency should be compromised. The channel estimation using the EM algorithm requires $\overline{B}^{(p)}$ expressed as in Eq. (16), which is to be reconstructed in step S502 by the soft decision of data:

$$[\overline{B}^{(p)}]_{l,l} = E_{b_l}[b_l \mid r, \hat{h}^{(p)}] \qquad \text{Eq. (16)}$$
$$= Pr(b_l = +1 \mid r, \hat{h}^{(p)}) - Pr(b_l = -1 \mid r, \hat{h}^{(p)})$$

Herein, the APPs (A Posteriori Probabilities) are obtained from the output of the MAP channel decoder.

For channel estimation using the EM algorithm, an initial value $\overline{b}^{(1)}$ is an initial value vector in which a pilot symbol is located in a position of a pilot subcarrier and zero is located in positions of other subcarriers. The initial value vector has a great influence on a performance of the EM algorithm. Therefore, more dense pilot symbols are required to obtain a better channel estimation value.

Next, as a first stage of step S503, an expectation expressed as in Eq. (17) is performed for obtaining the likelihood function for estimating the channel impulse response h on the assumption that the reception signal r, together with the to-be-detected symbol b, is given:

$$Q(h \mid \hat{h}^{(p)}) = E[\log f(b, r \mid h) \mid r, \hat{h}^{(p)}] \qquad \text{Eq. (17)}$$
$$= -\frac{1}{N_0}\left( \|r\|^2 - 2\Re(r^H E_b[B \mid r, \hat{h}^{(p)}]F_{ch}h) + \|F_{ch}h\|^2 \right)$$

Then, as a second stage of step S503, a maximization expressed as in Eq. (18) is performed for maximizing the likelihood function $Q(h\hat{h}^{(P)})$ obtained in the above-mentioned expectation:

$$\hat{h}^{(p+1)} = \arg\max_h Q(h \mid \hat{h}^{(p)}) \qquad \text{Eq. (18)}$$
$$= \arg\max_h \{-2\Re(r^H \overline{B}^{(p)} F_{ch}h) + \|F_{ch}h\|^2\}$$

where
$$\overline{B}^{(p)} = E_B[B \mid r, \hat{h}^{(p)}].$$

Thereafter, as a final stage of step S503, a resultant equation of the channel estimation value is calculated as in Eq. (19) to thereby update the estimation value of the channel impulse response:

$$\hat{h}^{(p+1)} = \frac{1}{L}F_{ch}^H(\overline{B}^{(p)})^H r \qquad \text{Eq. (19)}$$

In Eq. (19), $\overline{B}^{(p)}$ is the diagonal matrix obtained in step S502, which is constituted of respread symbols of the soft decision value in a $p^{th}$ iterative reception. Herein, the soft decision value corresponds to the soft decision of the channel soft output in a case where the intercell cooperation is weak; and corresponds to the soft decision of the decoded soft output in a case where the intercell cooperation is strong.

Then, the channel frequency response estimation value is obtained in step S504 by transforming the channel impulse response using Eq. (20):

$$\hat{\tilde{H}}^{(p+1)} = F_{ch}\hat{h}^{(p-1)} \qquad \text{Eq. (20)}$$
$$= \frac{1}{L}F_{ch}F_{ch}^H(\overline{B}^{(p)})^H r$$

Further, a more accurate estimation value of the channel frequency response can be obtained by repeating operations of step S502 to step S504 up to a final sequence P through step S505 and step S506. In step S505, it is checked whether or not p is smaller than P. Then, if the result is YES, the procedure is terminated; if otherwise, the procedure moves on to step S506. In step S506, the value of p is incremented by 1, and the procedure returns to the step S502.

As described above, the present invention has an effect of greatly mitigating intercell interference by applying the iterative reception technique using the parallel interference cancellation to all cells of a terminal that has a single reception antenna in a multi-cell downlink.

While the invention has been shown and described with respect to the preferred embodiments, it will be understood by those skilled in the art that various changes and modifications may be made without departing from the scope of the invention as defined in the following claims.

What is claimed is:

1. An intercell interference mitigation apparatus for use in a terminal having a single reception antenna in a multi-cell downlink of an OFDMA (Orthogonal Frequency Division Multiple Access) system, the apparatus comprising:
   a plurality of parallel interference cancellers for canceling intercell interference by respreading soft decision values of cells other than a self cell;
   a plurality of LLR creation blocks for creating channel LLRs (Log Likelihood Ratios) required for the soft decision for each of subcarriers, and producing channel soft outputs;
   a plurality of soft deciders for performing a soft decision of a self user symbol of the self cell in which interferences from other users are mitigated, and producing the soft decision values; and
   a plurality of channel estimation blocks for performing iterative channel estimation by respreading symbols of the soft decision values produced from the soft deciders,
   wherein said performing iterative channel estimation includes:
   constructing a symbol vector as an initial one by using a pilot symbol;
   updating a channel frequency response estimation value of the symbol vector by using a channel impulse response; and
   reconstructing the symbol vector by soft decision iterated for a predetermined number of sequences.

2. The apparatus of claim 1, further comprising:
   a plurality of channel decoders for decoding the channel soft outputs produced from the LLR creation blocks by performing a channel decoding, and providing decoded soft outputs to the soft deciders.

3. The apparatus of claim 2, further comprising:
   a plurality of de-interleavers for canceling channel concentration errors of the channel soft outputs produced from the LLR creation blocks, and providing the channel soft outputs to the channel decoders.

4. The apparatus of claim 1, wherein each of the LLR creation blocks includes a single tap equalizer for performing channel equalization per each of the subcarriers.

5. An intercell interference mitigation method for use in a terminal having a single reception antenna in a multi-cell downlink of an OFDMA system, the method comprising:

canceling intercell interference by respreading soft decision values of cells other than a self cell;

creating channel LLRs required for the soft decision for each of subcarriers to produce channel soft outputs;

performing a soft decision of a self user symbol of the self cell, in which interferences from other users are mitigated, to produce the soft decision values; and performing iterative channel estimation by respreading symbols of the soft decision values produced in said performing the soft decision, wherein said performing iterative channel estimation includes:

constructing a symbol vector as an initial one by using a pilot symbol;

updating a channel frequency response estimation value of the symbol vector by using a channel impulse response; and reconstructing the symbol vector by soft decision iterated for a predetermined number of sequences.

6. The apparatus of claim 5, further comprising:

decoding the channel soft outputs produced in said creating the channel LLRs by performing a channel decoding to provide decoded soft outputs to be used in said performing the soft decision.

7. The apparatus of claim 6, wherein, in said decoding the channel soft outputs, the channel coding is performed after channel concentration errors of the channel soft outputs are canceled.

8. The method of claim 5, wherein, in said creating the channel LLRs, user channel code information is shared among all cells to obtain the LLR.

* * * * *